Oct. 31, 1939.   A. J. BAZELEY   2,178,062
CAR COUPLING APPARATUS
Filed Dec. 5, 1935   13 Sheets-Sheet 1
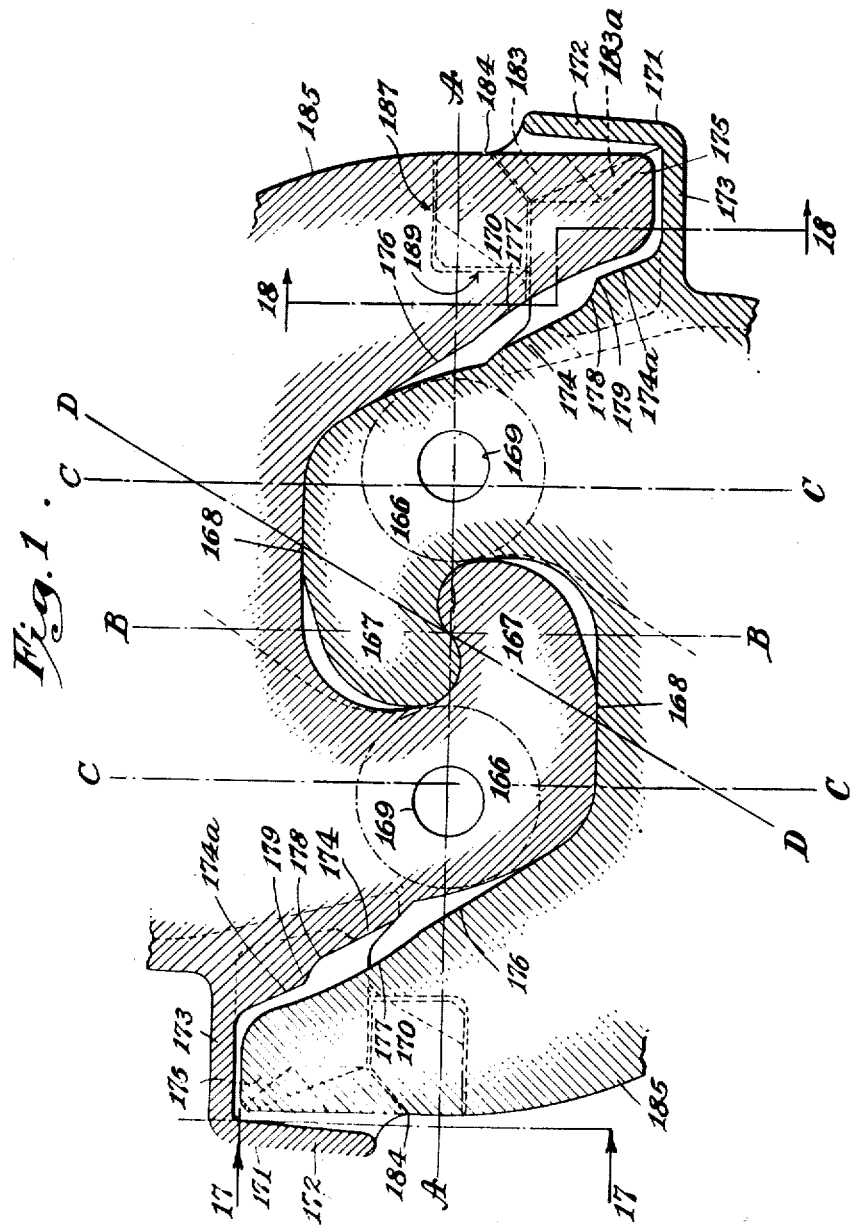
INVENTOR:
Arthur J. Bazeley
BY
Clarence [Kerr]
his ATTORNEY.

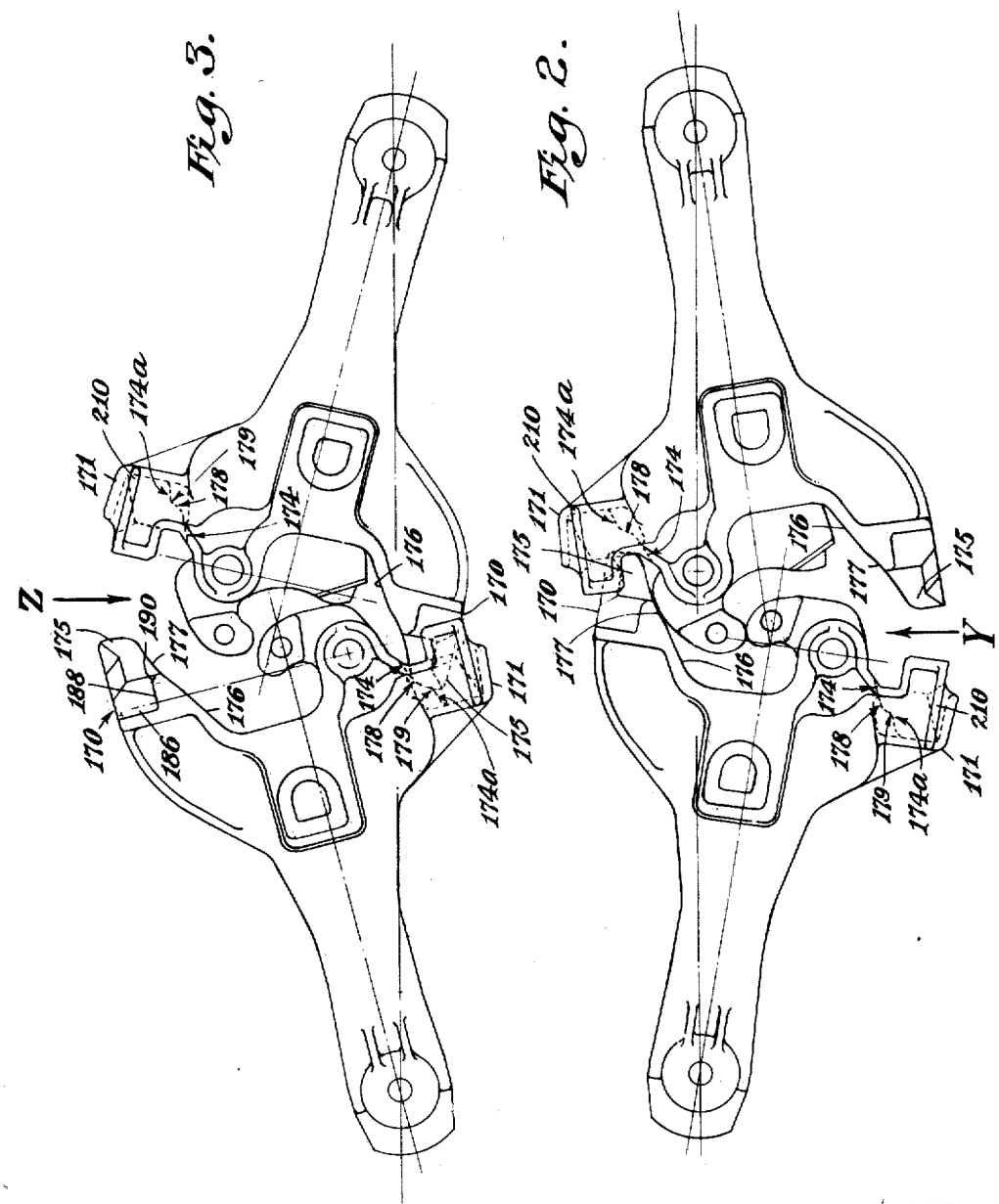

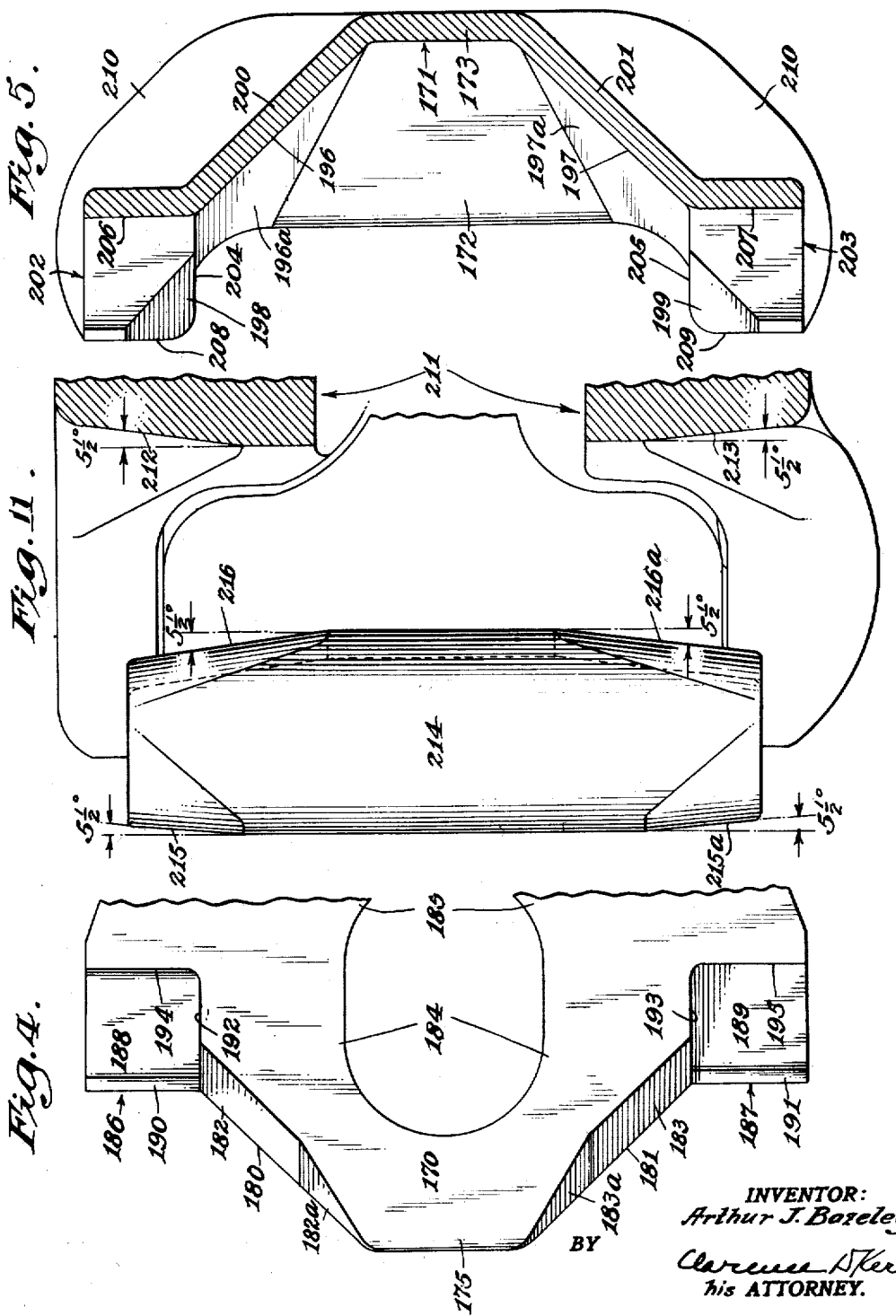

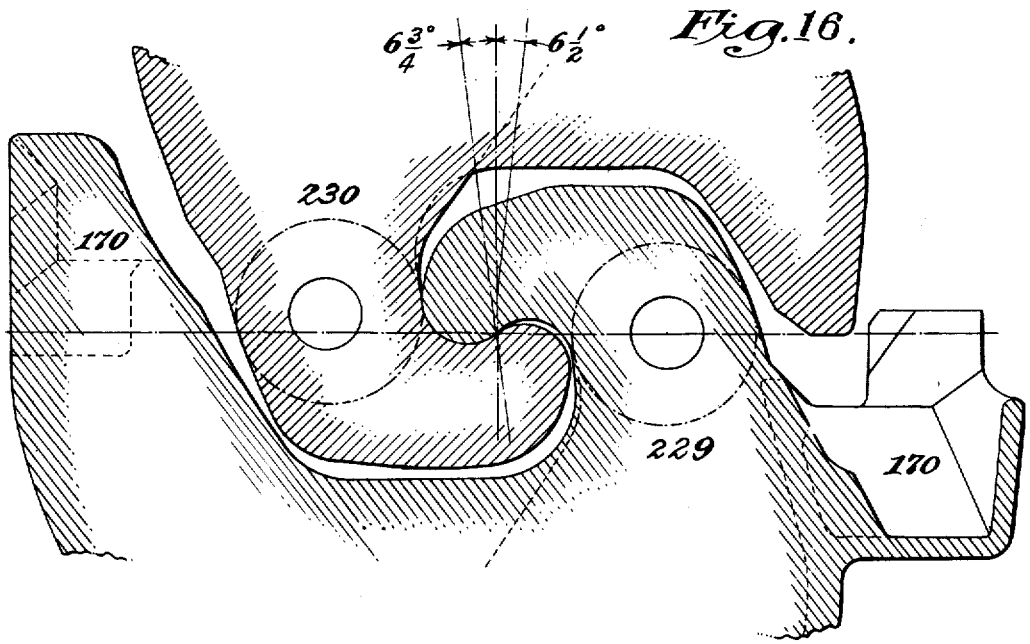
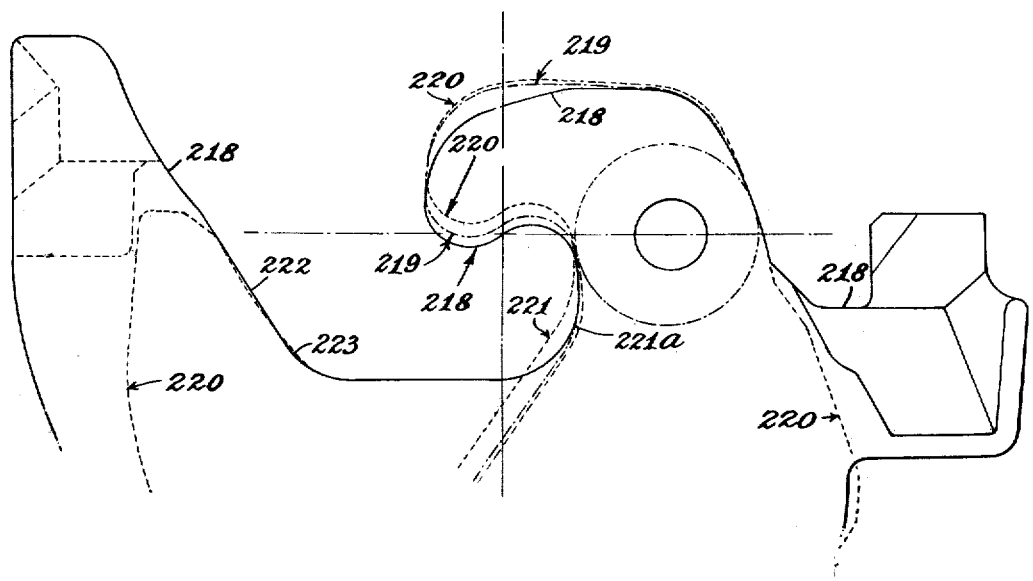

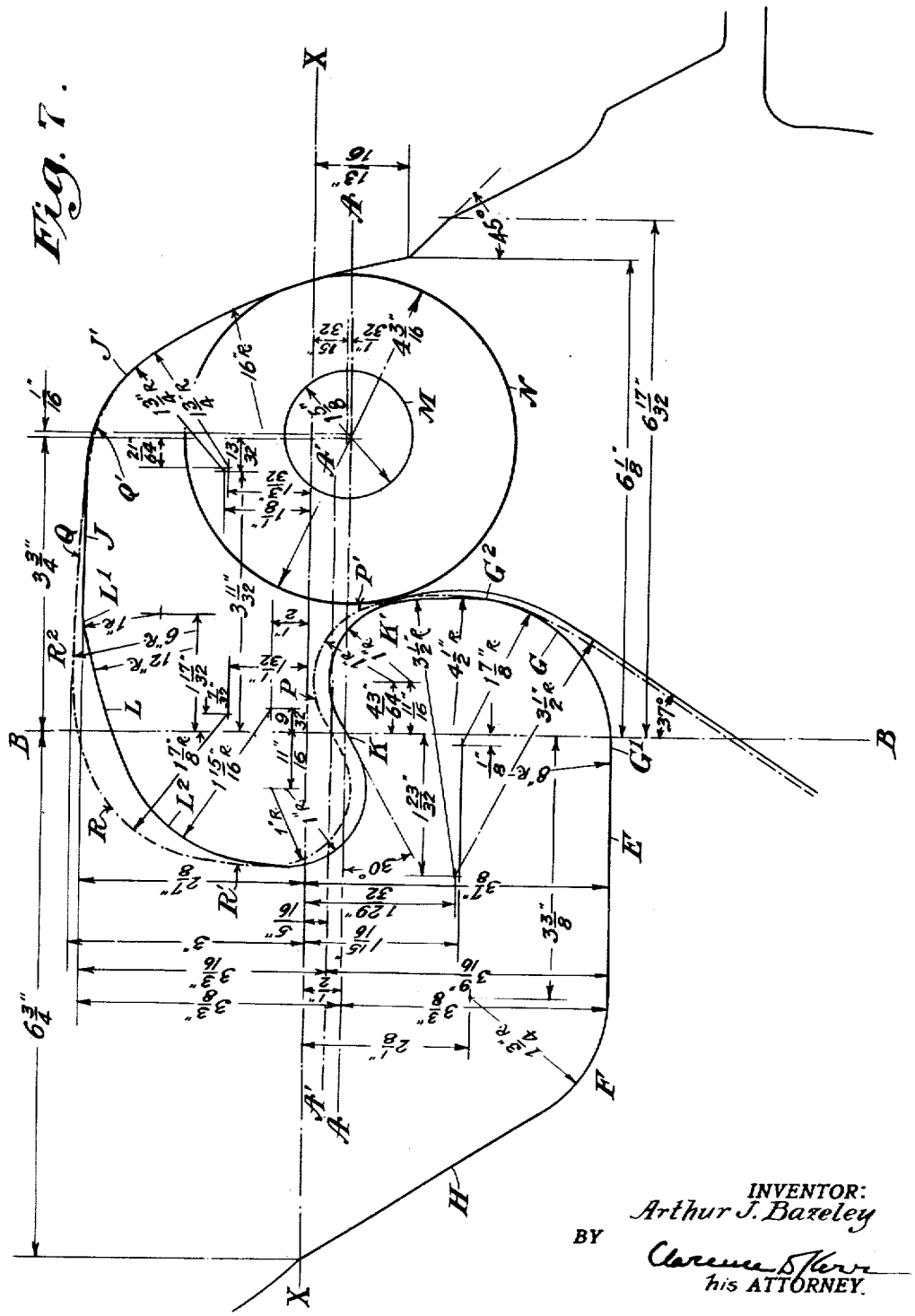

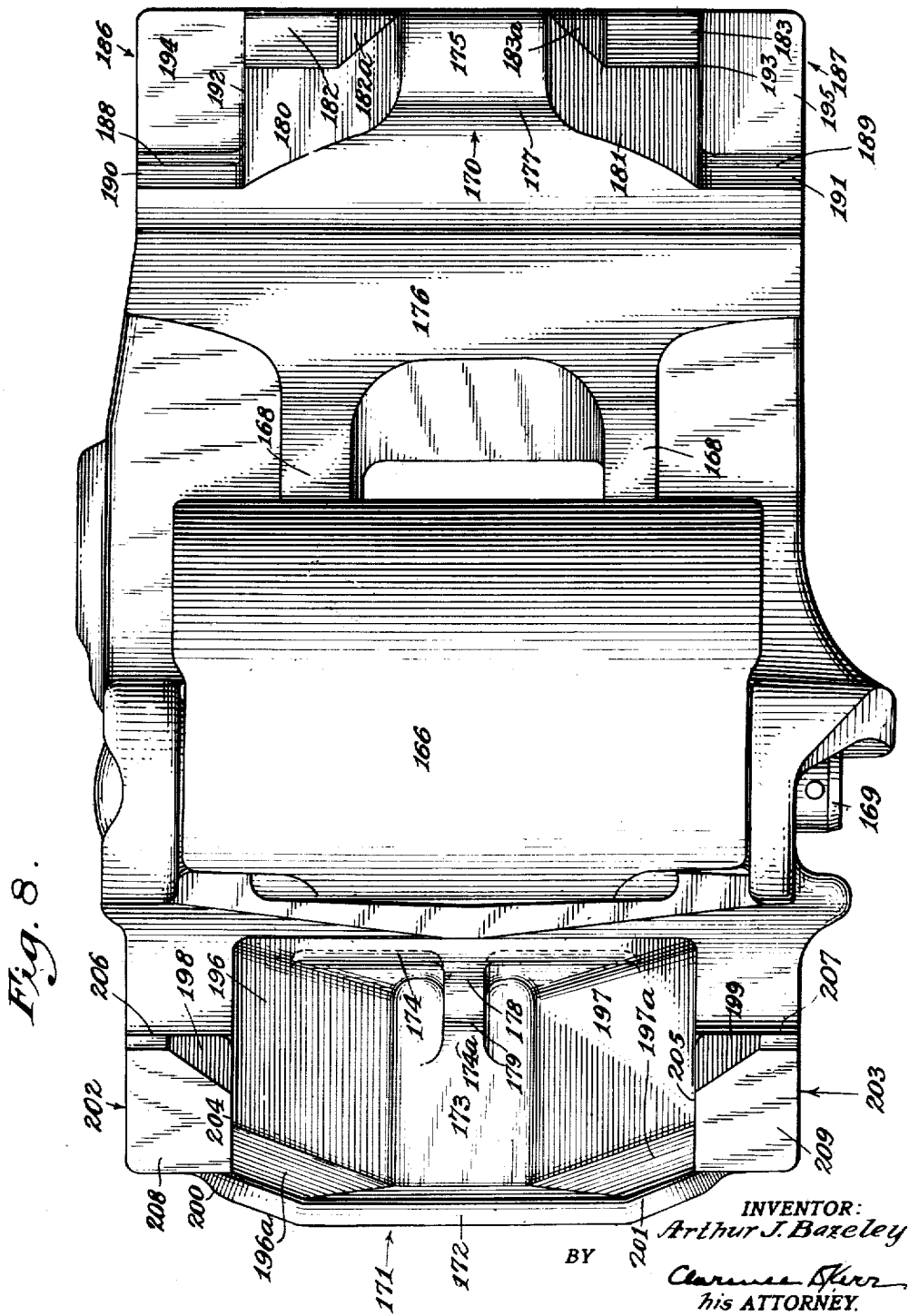

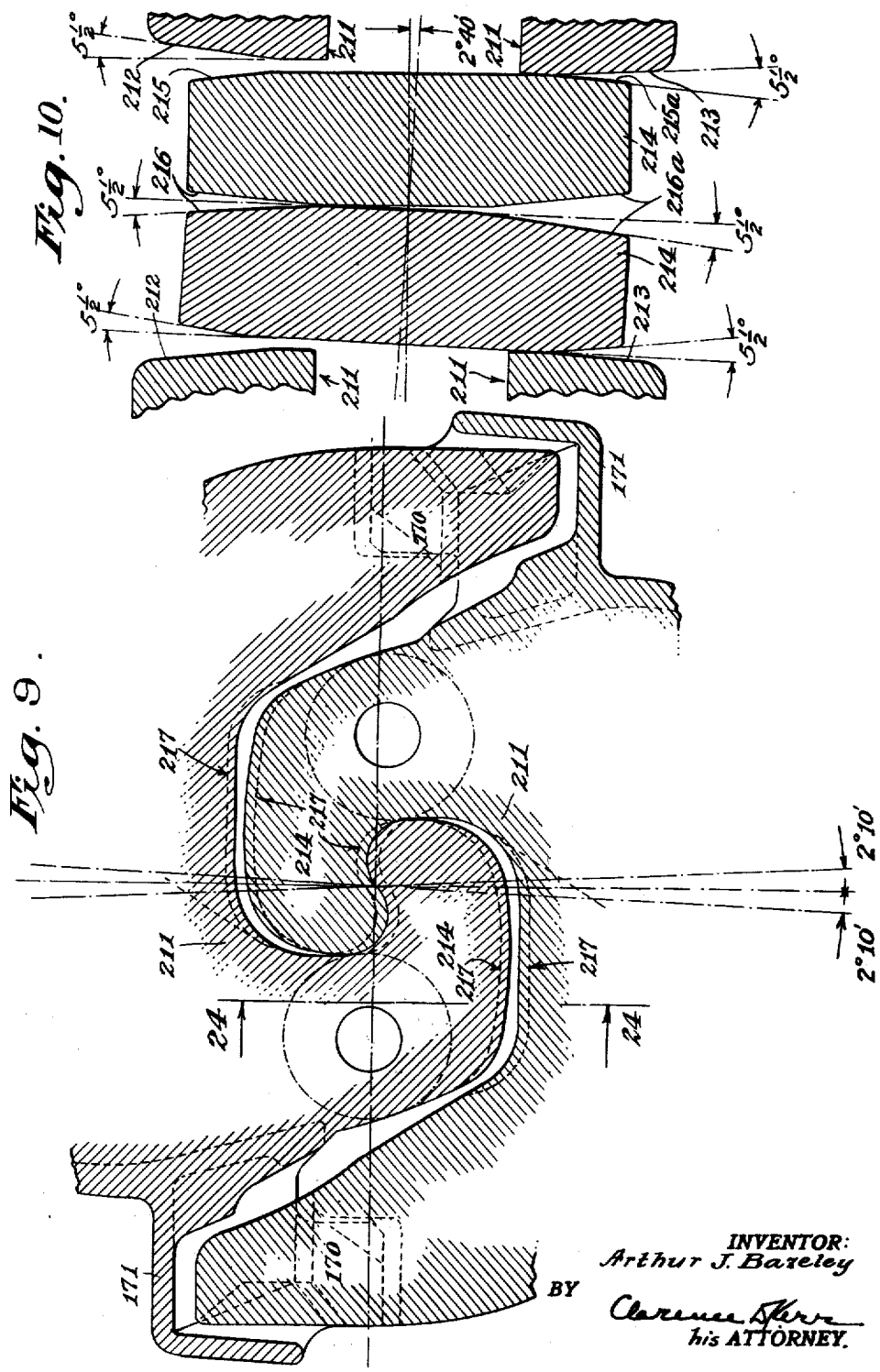

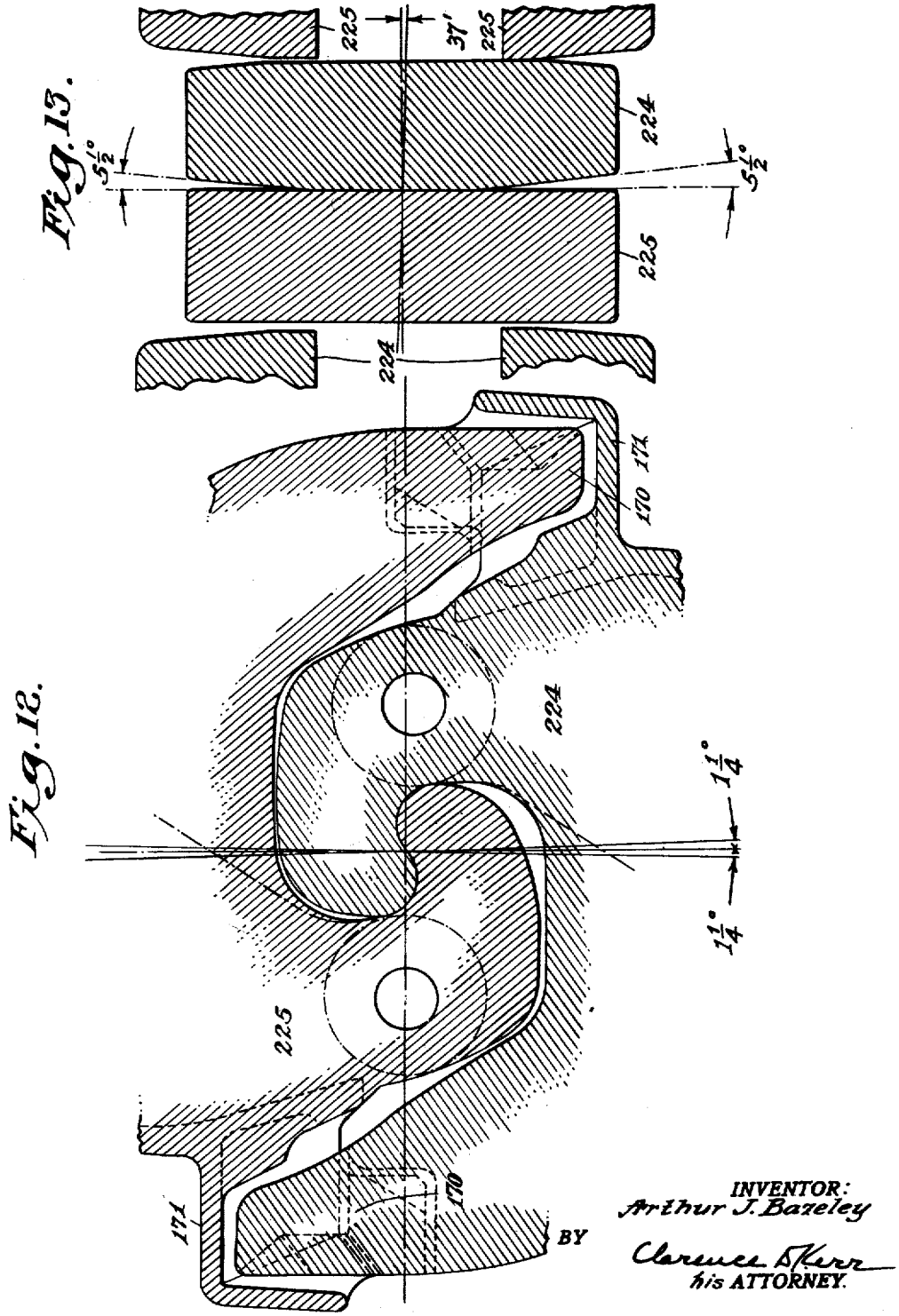

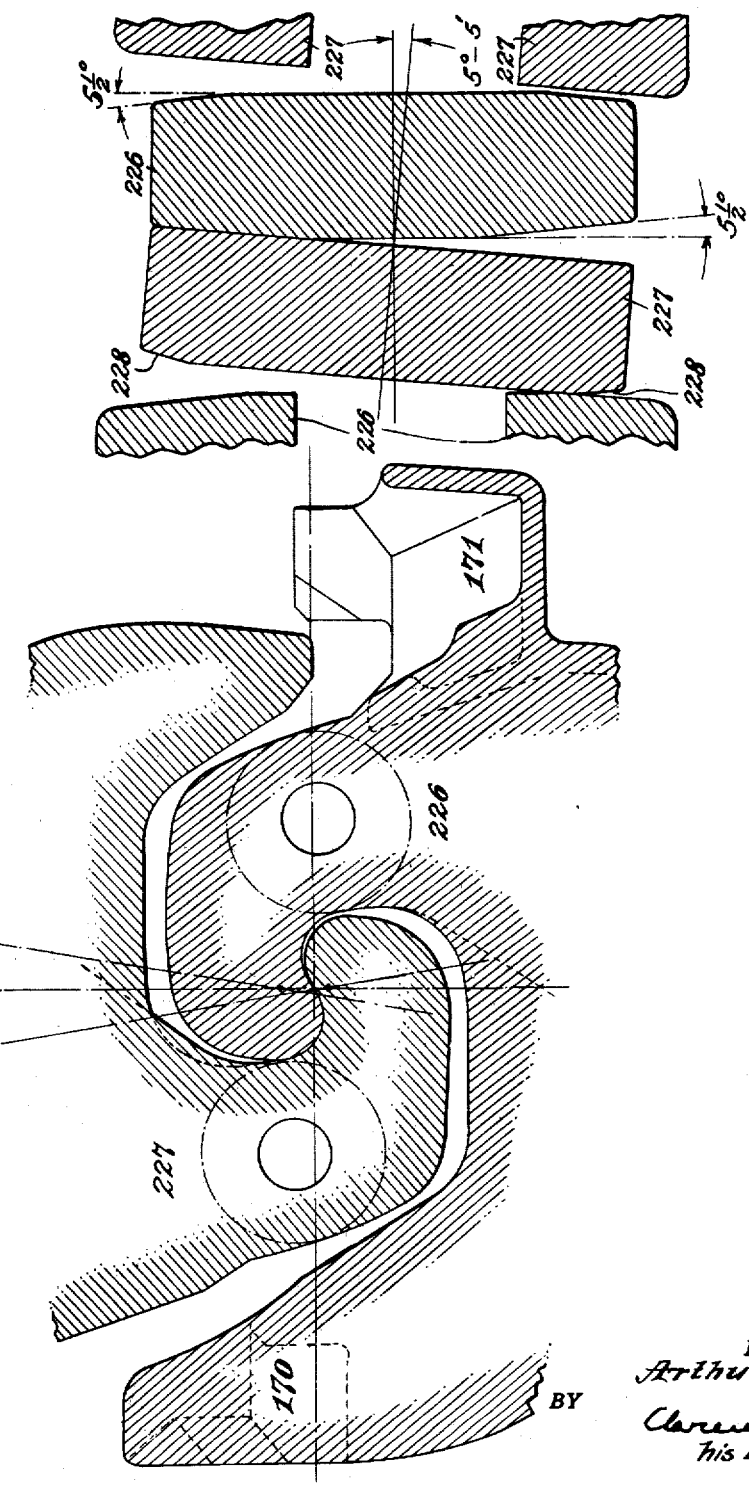

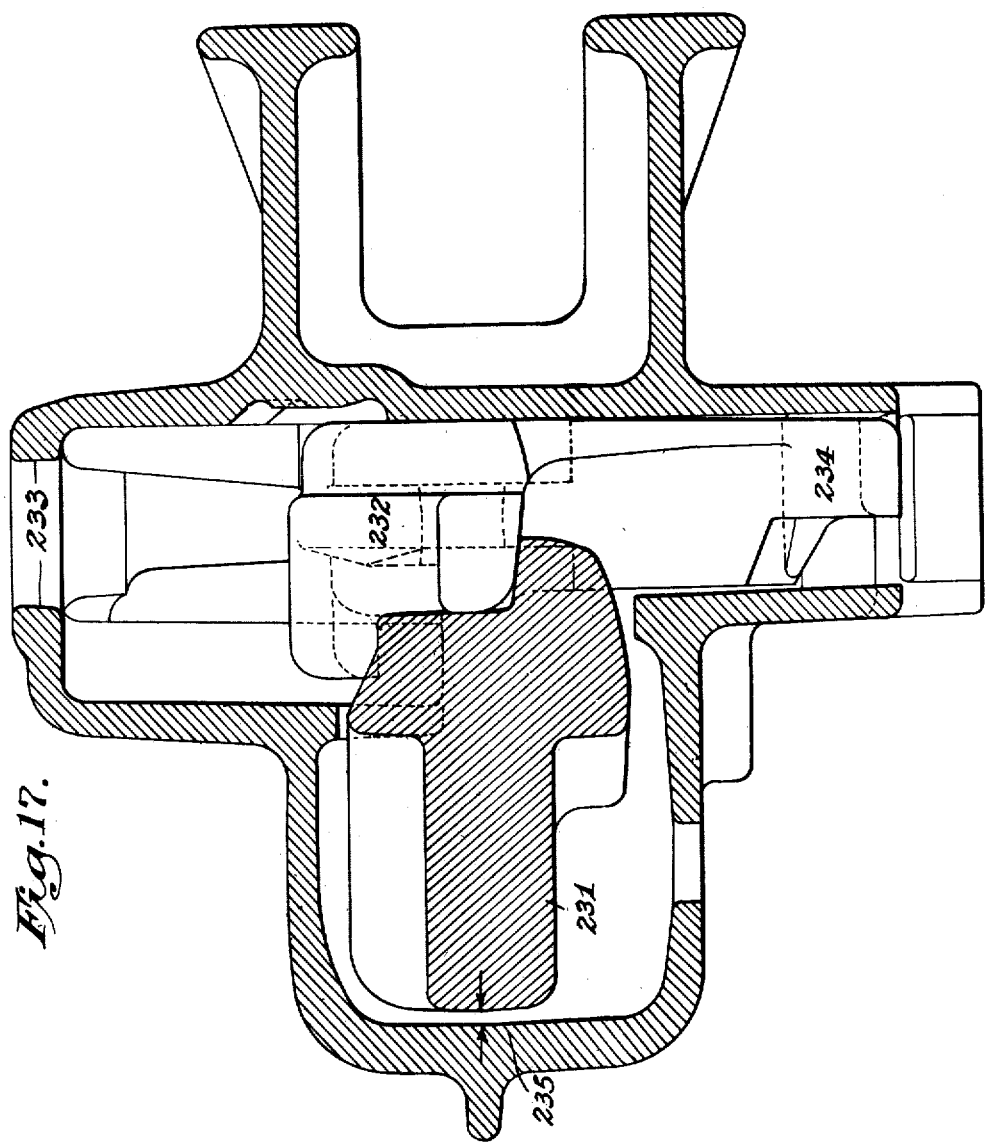

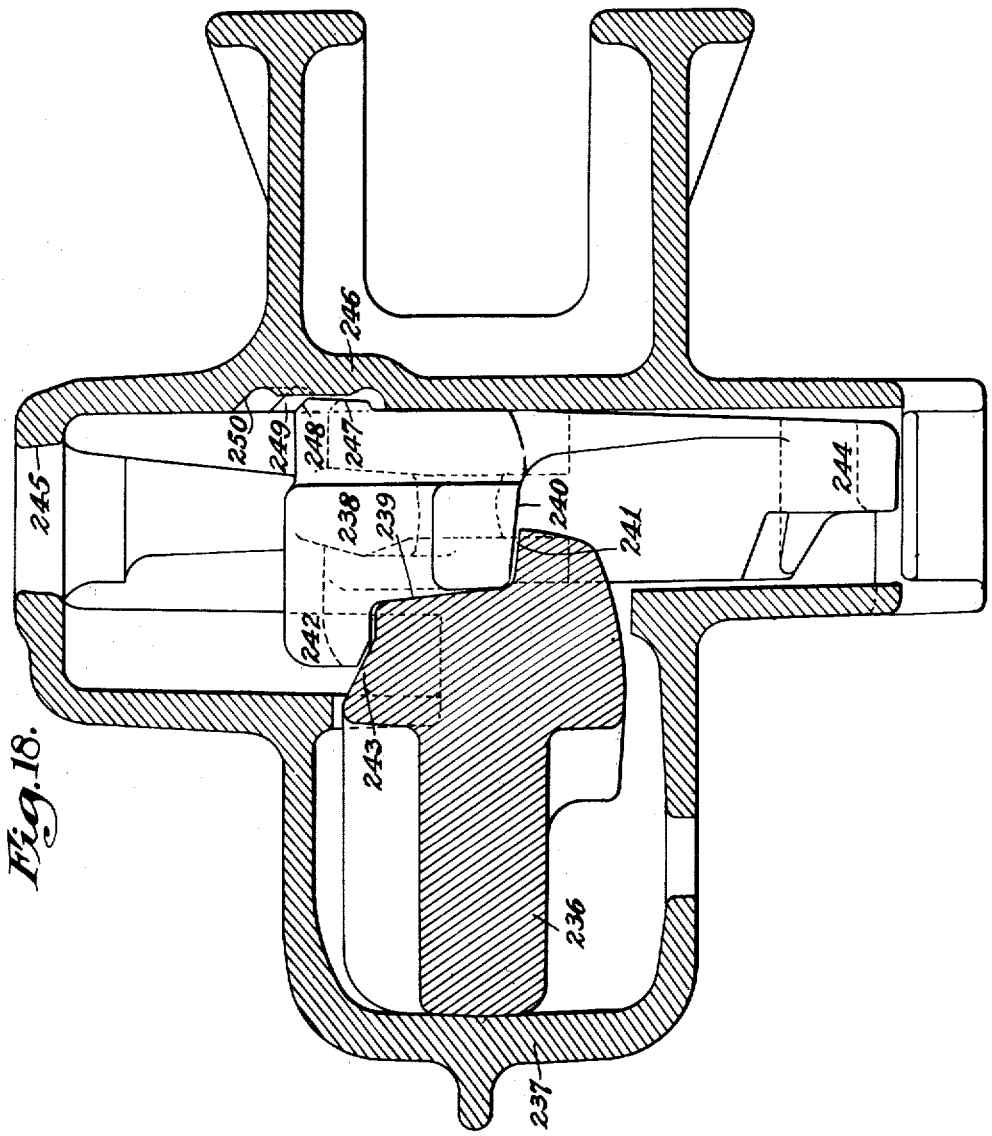

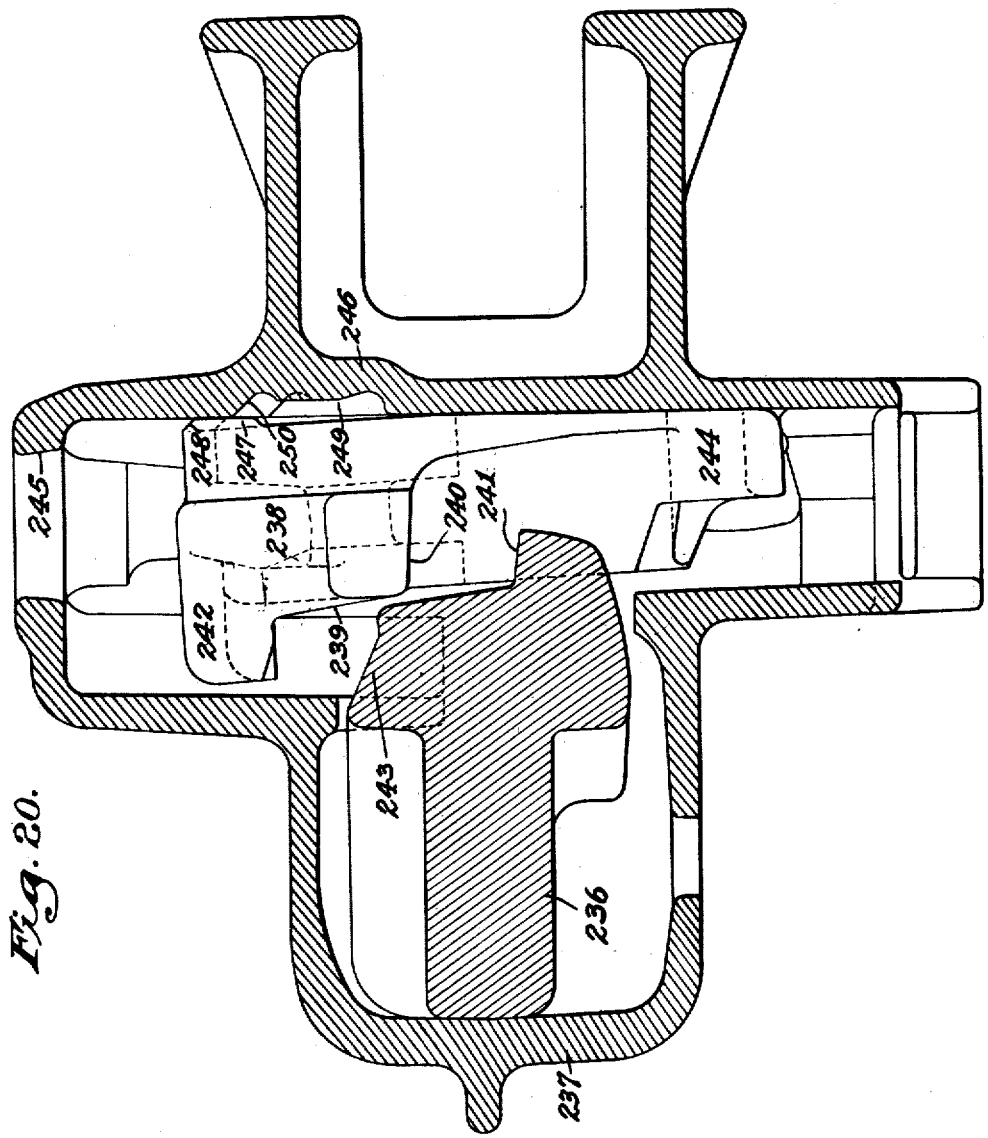

Patented Oct. 31, 1939

2,178,062

UNITED STATES PATENT OFFICE 2,178,062

CAR COUPLING APPARATUS

Arthur J. Bazeley, Shaker Heights, Ohio, assignor to National Malleable and Steel Castings Company, Cleveland, Ohio, a corporation of Ohio Application December 5, 1935, Serial No. 53,012

37 Claims. (Cl. 213—109)

My invention relates to improvements in car couplers and more particularly to a car coupler which may be tightly locked to another coupler of the same construction in order to substantially eliminate coupler slack, and to facilitate the automatic connection of hose lines, electric cables and the like when two cars are coupled together. By the use of such automatic connectors, the necessity and attendant dangers of having a person crawl in between two cars to connect or disconnect these lines is also eliminated.

One difficulty encountered in providing a practical tight-lock coupler resides in the fact that a certain amount of lateral and vertical angling must be made possible between two cars so that too great a strain will not be placed on the coupler head and knuckle when a train is traveling on a curved or graded track. This angling is largely taken care of with the standard E coupler having a 10 or 10A contour by the shape of the coupler heads and knuckles. Thus, according to present usage, the shanks of two couplers in coupled relationship may be angled both vertically and laterally with respect to each other. With a coupler tightly locked to a similar coupler, angling at the coupler faces is impossible and equivalent angling must be provided between the coupler and the car.

An object of my invention is to provide a coupler and knuckle adapted to cooperate with a similar coupler in such a manner that the two knuckle noses may be tightly interlocked and the knuckles faces may also be pressed directly against the opposing coupler faces. As a practical matter, it is impossible to immediately change existing coupling equipment on railways replacing all of such equipment with my improved tight-lock coupler. A particular and very important feature of my invention, therefore, resides in the provision of a tight-lock coupler having the advantages described above when coupled with a similar tight-lock coupler, and which is also adapted for coupling with equipment now in use, such as the standard E coupler having a 10 or 10A contour. This standard E coupler with the 10 or 10A contour will hereafter be referred to as a normal coupler or a normal contour.

A further feature of my invention is the provision of a coupler with a knuckle having a contour intermediate the contour of my tight-lock coupler and the normal or 10A contour, which may be termed a semi-tight coupler. Such a semi-tight coupler is adapted to cooperate with normal couplers, another semi-tight coupler or my improved tight-lock coupler. I have designed this semi-tight coupler to take care of vertical and lateral angling in the coupler head when coupled with a normal coupler. When coupled with another semi-tight or tight coupler most or all the vertical and lateral angling takes place at the connection between the coupler shank and the car. Thus by using couplers in accordance with my invention proper vertical and lateral angling may be obtained under all conditions.

Another object of my invention is to construct my improved tight and semi-tight couplers with interchangeable knuckles so that after a railroad has been completely equipped with semi-tight couplers, the knuckles thereof may be replaced as they wear out with tight-lock knuckles. In such cases, a wedge lock is preferably used to cooperate with the tight knuckle as hereinafter described.

Another object of my invention is the provision of lateral wings for my improved tight and semi-tight couplers to act as gathering means for aligning two mating couplers both laterally and vertically; these lateral wings also cooperate with each other in coupled position to prevent substantial relative lateral and/or vertical displacement of the couplers.

A further object of my invention is to provide a gravity operated wedge lock for use in combination with my improved tight-lock coupler to maintain a tight lock under all conditions and prevent any backlash of the coupler knuckle.

The above features and advantages may be better understood in connection with the accompanying drawings. In addition, several constructional features, objects and advantages of this invention, which have not been mentioned above, will be pointed out in connection with the following description of the embodiments of my invention illustrated in the drawings, in which:

Figure 1 is a horizontal sectional view through the center of two tight-lock couplers in coupled position.

Figure 2 illustrates the coupling of two tight-lock couplers which are angled laterally with respect to each other with the inner knuckle open.

Figure 3 illustrates the coupling of two tight-lock couplers which are angled laterally with respect to each other with the outer knuckle open.

Figure 4 is a side elevation of a wedge projection for use with either a semi-tight or tight-lock coupler and viewed in the direction of the arrows on the line 17—17 of Figure 1.

Figure 5 is a side elevation partly in section of a wedge socket for cooperation with the wedge projection of Figure 4 viewed in the direction of the arrows on the line 18—18 of Figure 1.

Figure 6 is a plan view of the outlines of a tight, semi-tight, and normal coupler superposed on each other.

Figure 7 is a diagrammatic view illustrating the preferred contours of my improved tight-lock and semi-tight couplers in detail and taken approximately through the centers of the couplers.

Figure 8 is a front elevation of my improved coupler head fitted with a tight-lock knuckle.

Figure 9 is a horizontal sectional view through approximately the center of two semi-tight couplers in coupled position.

Figure 10 is a vertical sectional view taken on the longitudinal axes of the couplers shown in Figure 9.

Figure 11 is a side elevation of a semi-tight coupler, including the knuckle, taken on the line 24—24 of Figure 9.

Figure 12 is a horizontal sectional view of a tight coupler and a semi-tight coupler in coupled position.

Figure 13 is a vertical sectional view taken on the longitudinal axes of the couplers of Figure 12.

Figure 14 is a horizontal sectional view of a semi-tight coupler coupled with a normal coupler.

Figure 15 is a vertical cross section on the longitudinal axes of the couplers of Figure 14.

Figure 16 is a horizontal sectional view of a normal coupler and a tight coupler in coupled position.

Figure 17 is a vertical sectional view of a coupler lock and knuckle looking toward the coupler shank and illustrating a device such as is now in use.

Figure 18 is a similar vertical sectional view showing the relative positions of a gravity operated wedge lock and my improved tight-lock coupler knuckle in locked position.

Figure 20 is a view similar to Figure 18 with the lock partially raised at the start of the uncoupling operation.

Figure 19:
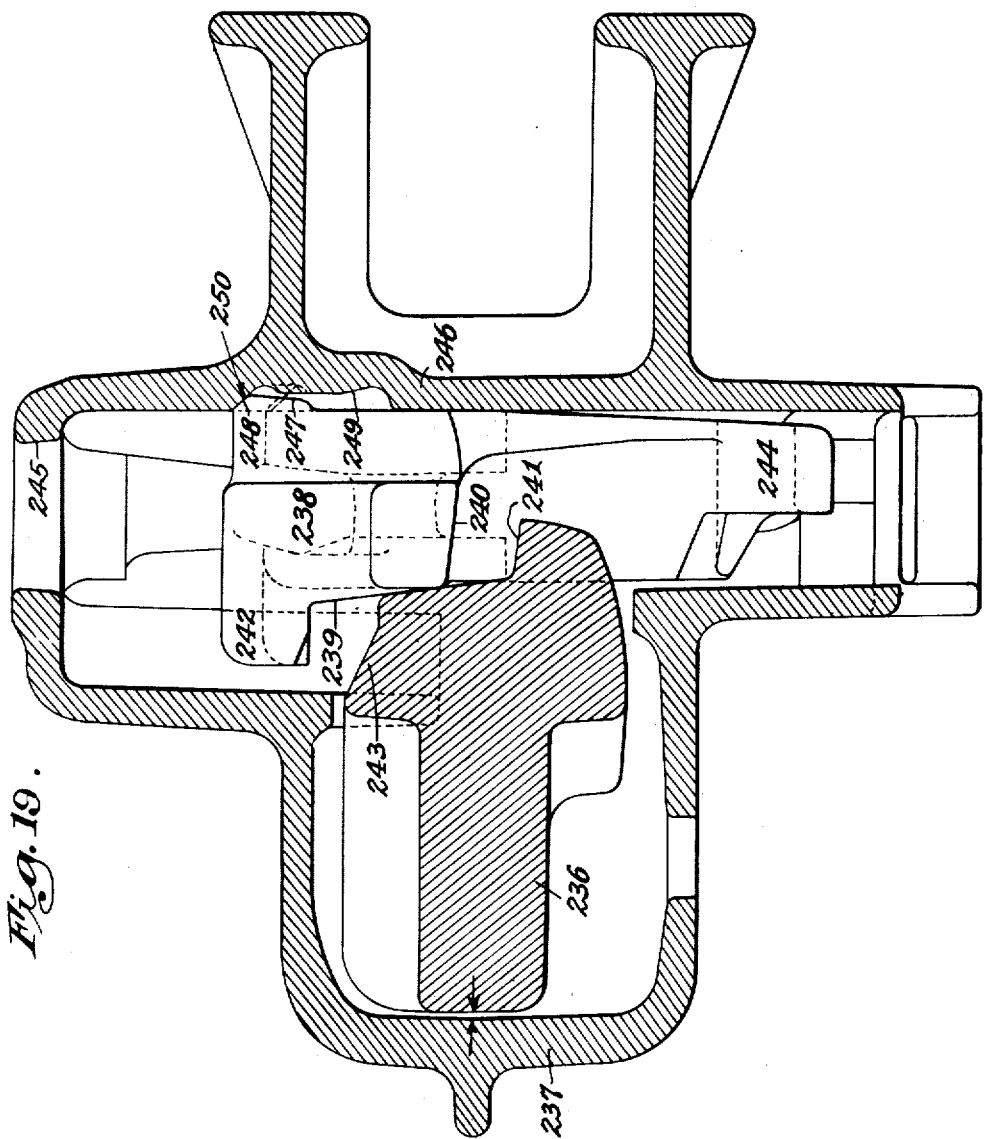
Figure 19 is a view similar to Figure 18 but showing the wedge lock engaging the anticreep shoulder.

Figure 1 illustrates two of my novel tight-lock couplers in coupled position, A—A indicating the coupling line and B—B indicating the longitudinal axes of the two couplers. The contours of coupler knuckles 166 are so arranged that the knuckles interlock tightly with each other at their nose portions 167 and also with the coupler faces 168. Buffing stresses are transmitted directly to the coupler head along the lines C—C and also diagonally along the line D—D.

The contour of the coupler head and of my improved tight-lock coupler knuckles are illustrated in solid lines in Fig. 7, but it should be understood that my invention is not limited to any specific contour and that this preferred contour is only described herein as illustrative.

In the drawings the line X—X indicates the construction line for both the tight-lock coupler shown in solid lines and the semi-tight knuckle shown in dot dash lines.

The coupler buffing face is formed with a straight section E which curves forwardly at each of its ends. One end F has a radius of curvature of about 1¾ inches while the main portion G of the other end is curved about a radius of approximately 1⅞ inches. The intermediate curves $G^1$ and $G^2$ may be formed about radii of 8 inches and 4½ inches, respectively. The surface H of the guard arm is preferably flat.

The tight-lock knuckle with such a coupler head contour may be designed with the coupling line A—A about 3⅜ inches from the buffing face E. In other words, the average distance of the knuckle face K from the coupler face E or an extension thereof is about 3⅜ inches. The buffing face J of the knuckle is also preferably straight and curves back on its outer side at J' about a 1¾ inch radius, thus providing a surface adapted to fit tightly and engage the buffing face portions E and F on the coupler head. The knuckle nose may be formed with a reversely curved face K struck on oppositely disposed 1 inch radii; the inner portion K' is preferably provided with a flattened curve adapted to meet with the curvature of the coupler head. The outer face of the knuckle nose is preferably cut away sharply and may be formed with a plurality of arcs L, $L^1$, and $L^2$ taken on radii of 12, 1 and 1⅛ inches, respectively, to facilitate coupling operations. By employing a coupler of such construction for coupling with a semi-tight coupler or a normal coupler, train slack is decreased about 75 and 50% respectively.

The pivot pin M of the knuckle is preferably slightly offset with respect to curved face N of the knuckle, with the center of said pin located 1/32 inch above and 1/16 inch to the right of the center of the hub surface N as is indicated in Fig. 7.

Lateral gathering and aligning wings are provided on each side of the coupler heads (Figs. 1–6, 8, 9, 12, 14 and 16) and are made up of wedge projections 170 on one side and wedge sockets 171 on the other, with the wedge sockets preferably provided on the pivot pin side. These wedge sockets may be formed with outwardly extending flanges 172 and bases 173, which cooperate with the outer walls 174 of the coupler heads to provide pockets adapted to receive the ends 175 of the wedge projections.

The wedge projections 170 have their inner surfaces 176 inclined to cooperate with the inclined side walls 174 and rib 174a of the coupler heads to permit the lateral aligning of one coupler with respect to another during the coupling operation. As cars are frequently coupled together while on a curve or one of the couplers may be angled from the central position, some provision of this sort is necessary.

The inclined walls 176 of the projections 170 are preferably cut away slightly to form a concave slightly curved vertical surface 177 to prevent any jamming tendency when the tight-lock coupler is coupled with another tight-lock coupler or with a normal coupler of a 10A contour, under certain conditions, as on a curve, with the inner knuckle open (see Fig. 2). With two couplers in the position shown in this figure, a force is exerted in the direction of the arrow Y tending to straighten the couplers with respect to each other and allow the coupling operation to take place. By means of this cut-out portion on the guard arm, the effective throat of the coupler is enlarged just sufficiently to allow coupling under all conditions without increasing the gauge of the coupler. This jamming tendency also exists to some extent on a straight track but in either case is overcome by this provision, which permits the coupler knuckle to slide easily through the throat of the tight-lock coupler.

The side wall of the rib 174a on the coupler head is preferably inclined to form a surface adapted to cooperate with the nose 175 of an opposing guard arm to obtain a smooth coupling action under all conditions. This rib 174a is preferably cut away at 178 to form a shoulder 179 for assisting in rolling an opened knuckle into coupled position. For example, when two tight-lock couplers are being coupled, with the couplers angled with respect to each other, and the outer knuckle open (see Fig. 3) the inner nose 175 will slide along the opposing surface 174 of the coupler head until it strikes the depression 178 and the shoulder 179. A force is thereby exerted in the direction of the arrow Z tending to straighten the couplers relative to each other to allow the open knuckle to be rolled around into interlocking position.

The contacting surfaces of my improved tight-lock coupler, that is the coupler face and the knuckle faces are preferably plane and straight and at right angles to the longitudinal center line of the coupler shank, thereby preventing any possibility of vertical or lateral angling between two couplers or rocking of the knuckles such as would tend to displace the coupler locks.

With particular reference to Figures 1, 4, 5 and 8, it may be seen that the wedge projection 170 is tapered vertically towards the nose 175. The upper and lower tapered surfaces 180 and 181, respectively, are inclined at any suitable angle to provide the necessary vertical gathering. Surfaces 182, 183 and the surfaces 182a, 183a are further inclined to ensure lateral gathering under extreme conditions and to also assist in the vertical aligning. The outer face 184 of the wedge projection is a vertical plane surface except for the rounded tip of the nose and the portion 185 of the surface which curves inwardly toward the coupler head. Vertically extending members 186 and 187 may also be employed at both top and bottom of the wedge projection 170. These members 186 and 187 preferably comprise relatively thin plate-like sections of metal having outer surfaces 188 and 189 substantially parallel to the surface 184, and inner surfaces coextensive with the inner surface of the wedge projection. The vertical surfaces 190 and 191 thereof may be inclined at any desirable acute angle to the longitudinal axis of the coupler. These upper and lower sections of the wedge projection are also cut out leaving pockets defined by substantially plane surfaces 192, 193, 194 and 195 in conjunction with the surfaces 188 and 189 all three of said surfaces in each set being at right angles to each other.

The wedge socket 171 is designed to cooperate with wedge projection 170 and is provided for the most part with complemental surfaces. The upper and lower surfaces 196 and 197 are inclined to the horizontal axis of the coupler at substantially the same angle as the surfaces 180 and 181 respectively of the wedge projection and are augmented by the surfaces 196a and 197a inclined to both the horizontal and vertical axes of the coupler. These six surfaces are thereby arranged to provide for vertical and to some extent lateral gathering or aligning of the couplers. Additional vertical gathering may be provided by the upper and lower surfaces 198 and 199 on the wedge socket which are preferably inclined at some angle between the angles of the surfaces 196, 196a, 197 and 197a, respectively.

The walls 172, 173, 200 and 201 thus provide a socket vertically tapered inwardly and adapted to receive the main portion of a wedge projection. The relative sizes of the wedge projection and this socket are preferably such that the projection fits relatively loosely within the socket with the forward end of the wedge projection nose 175 spaced from the socket walls 172, 173, 200, 201 and the side 174 of the coupler head when two tight-lock couplers embodying lateral wings in accordance with my invention are coupled together.

The upper and lower portions of the wedge socket are preferably formed with lugs 202 and 203 having horizontal surfaces 204 and 205, respectively, cooperating with the surfaces 192 and 193 to hold the mated couplers against vertical displacement relative to each other. The vertical surfaces 206 and 207 are substantially parallel to the longitudinal axis of the coupler and are designed to cooperate with the surfaces 188 and 189 while the vertical surfaces 208 and 209 are complemental to the surfaces 194 and 195 of the wedge projection. If desired, the wedge socket may be suitably reinforced by a flange 210 (see Figs. 3 and 5) substantially parallel to the coupler axis.

Thus two couplers equipped with my improved lateral wings have a very considerable gathering range both vertically and laterally. In addition two of such couplers when mated are restrained by the wings against movement either vertically or laterally with respect to each other. This feature of my invention is not necessarily limited to use with my improved tight-lock coupler, although use therewith is particularly advantageous. For example, these wings may be readily employed with my semi-tight or other couplers. Lateral wings such as described do not interfere with, but in fact cooperate to some extent with, a normal coupler such as one employing a 10A contour.

My improved semi-tight coupler as illustrated in Figs. 7, 9 and 10 differs only from my tight-lock coupler in the knuckle. This knuckle contour is made, generally speaking, as a compromise between my improved tight-lock coupler knuckle contour and the contour of a 10A knuckle so that my semi-tight and tight-lock knuckles may be interchanged in the coupler of my invention and perform their respective functions.

When semi-tight couplers 211 are employed throughout a train, the train slack is reduced approximately 50% over the use of 10A couplers. By reason of the difference in knuckles the lateral wings do not fit as closely when two semi-tight couplers are under draft (Fig. 9) as when the same lateral wings are employed with tight-lock knuckles. With semi-tight knuckles, a small amount of angling may take place between interlocked couplers; this angling amounts to about 2 degrees 10 minutes in each direction laterally, and about 2 degrees 40 minutes in each direction vertically.

The coupler faces employed in both the tight-lock and semi-tight couplers are preferably beveled at top and bottom as illustrated at 212 and 213 (see Fig. 10) to provide for additional vertical angling, particularly in cooperation with a standard 10A coupler, although these beveled surfaces are not necessary for use with tight-lock couplers. A 5½° bevel has been found to be sufficient for this purpose. The outer face of the semi-tight knuckle 214 is also preferably beveled for a short distance at both top and bottom, as at 215, 215a, while the inner face is preferably provided with a somewhat longer bevel 216, 216a. The lateral extent of these 5½° beveled surfaces is indicated by the dotted lines 217 in Fig. 9.

The contour of the coupler head and buffing face when employing my semi-tight knuckle is preferably the same as that described in connection with the tight-lock knuckle illustrated in Fig. 7. The dot dash lines in this figure designate a preferred contour for my semi-tight knuckle, it being apparent that the details thereof may be varied considerably within the scope of my invention.

In Fig. 7, A'—A' represents the coupling line of this semi-tight knuckle which may be positioned about 3⅛ inches from the buffing face E. The inner face P of the knuckle nose may be shaped similarly to the face K of the tight knuckle on one inch centers with a gradually curved section P' blending into the curve of the coupler head. The knuckle buffing face Q of the semi-tight knuckle may also be flat similar to the buffing face J, but is preferably inclined slightly to the coupling line as illustrated. The face Q may be suitably curved on a 1¾ inch radius at Q' and tapered into the contour of the outer surface of the knuckle. The outer face R of the semi-tight knuckle nose is preferably uniformly curved on a 1⅞ inch radius and graduated to the adjoining surfaces by a short plane surface R' and a short arcuate surface R² taken on about a 6 inch radius.

Other contours intermediate the tight-lock and the normal 10A contours may be employed although the contour above described for a semi-tight coupler provides for a substantial reduction in train slack under all conditions of usage and, at the same time, affords adequate vertical and lateral angling at all times. In accordance with my invention, the distance from the coupling line to the buffing face of the coupler or an extension thereof is preferably less than 3⅞ inches where the gauge of the coupler is normal, that is about 4.6 inches. By the gauge of the coupler, I mean the width of the throat, or the shortest distance from the knuckle nose to the coupler guard arm. With a coupler of smaller or larger gauge, this distance of the coupling line from coupler buffing face should be proportionately decreased or increased, respectively.

Figure 6 illustrates the difference in contours of my improved semi-tight and tight-lock couplers as compared with a normal coupler. The contours are taken through the longitudinal center lines of the respective couplers. My tight-lock coupler is illustrated by the solid lines 218. My semi-tight coupler is illustrated by the dot dash lines 219 and differs from the tight coupler only in the contour of the knuckle. A standard coupler having a normal 10A contour is indicated by the dash line 20. Aside from the difference between the several knuckles, which will be apparent in view of the above description of tight and semi-tight knuckle contours, my improved contour differs from the 10A contour chiefly in the enlarged opening formed by cutting back the tail of the knuckle so as to eliminate the strip between the dash line 221 and the solid line 221a. The guard arm is also filled in slightly as at 222 and the coupler face is cut out at 223 to obtain a tight lock adapted to transmit buffing stresses more easily. Thus, it is apparent that both my semi-tight and tight-lock couplers represent a marked departure from couplers which are now in general use and considered standard.

The cooperation of a semi-tight coupler 224 with a tight-lock coupler 225 is illustrated in Figures 12 and 13. By employing this combination of couplers, train slack is reduced about 75% and relative movement between the two couplers is practically eliminated in coupled position. Such couplers may be angled laterally with respect to each other about 1 degree 15 minutes in each direction, while the vertical angling possible, amounts to about 37 minutes in each direction.

Figures 14 and 15 illustrate the use of a semi-tight coupler 226 with a normal coupler 227. It can be readily seen that the wedge socket 171 and wedge projection 170 in such a combination do not interfere at all with coupling or uncoupling operations, and do not prevent maximum amount of vertical and lateral angling. Full use of the 5½ degree bevel on the semi-tight coupler is made in this combination and the small beveled edges 228 of the 10A knuckle provide slightly more than 5 degrees of vertical angling. Thus, the couplers may be angled laterally about 9¼° in one direction and 9¾° in the other direction, while approximately 5 degrees 5 minutes of vertical angling is possible in each direction.

The use of my tight-lock coupler 229 with a normal 10A coupler 230 is indicated in Figure 16. Lateral angling may take place to the extent of 6¾° in one direction and 6½° in the other, while a limited amount of vertical angling is possible. Such a combination may be satisfactorily used on passenger cars where conditions requiring sharp vertical angling are not usual.

The further feature of my invention is concerned with the use of a gravity operated wedge lock in combination with a tight-lock coupler, to maintain the coupler in its tight locked position during operation.

Referring more particularly to Figures 17 to 20, which are views looking toward the coupler shank, 231 indicates the knuckle tail of a normal 10A coupler knuckle held in locked position by the usual type of gravity lock 232. Such a lock may be lifted out of locking position by a conventional lifter operating through the hole 233 and the lower portion 234 of the lock may operate a knuckle thrower in the usual manner to roll back the knuckle preparatory to coupling or in uncoupling. It will be noted that the knuckle tail 231 is spaced from the wall 235 of the coupler in locked position a distance which usually amounts to about one-quarter of an inch and is equivalent to a ⅛ inch back lash on the knuckle nose. Under alternate conditions of buff and draft the knuckles and knuckle tails are subjected to considerable amount of rough treatment due to this play.

Figure 18 illustrates the tail 236 of the knuckle of my improved tight-lock coupler held in locked position firmly against the coupler wall 237 by a gravity operable wedge lock 238. This wedge lock is preferably formed with the side wall 239 engaging the coupler knuckle tapered so that the lock constantly urges the knuckle tail to the left, as viewed in Fig. 18. The lock and coupler knuckle are preferably proportioned so that the bottom portion 240 of the lock, in its fully wedged or locked position, does not strike the shelf 241 on the knuckle tail, and the lateral projection 242 is clear of the top of the knuckle tail shoulder 243. The lower portion 244 of the lock may cooperate with a knuckle thrower in the usual manner as previously described when the lock is lifted. This may similarly be accomplished by means of a lifter operated through the hole 245. Near the top and on the side of the lock adjacent the wall 246 there is provided a rib or lug 247, the top surface 248 of which is preferably beveled, and the wall 246 is recessed at 249 to receive this lug when the lock is in locked position. The cut-out portion 249 may be formed with an anti-creep ledge 250 adapted to cooperate with the surface 248 of the coupler lock and prevent the creep of the lock more than a certain distance, as shown in Fig. 19. In such a position the knuckle tail 236 is pulled away slightly from the coupler wall 237 but no back lash is developed by reason of the fact that as soon as the pressure on the lock from the knuckle is removed, the lock will drop back into wedge position, again tightly locking the parts together. The anti-creep provisions above mentioned are used in addition to the usual anti-creep mechanism present in conventional couplers.

When a gravity operated wedge lock is employed in connection with couplers heretofore known which lack tight lock features, powerful forces are set up tending to force the lock upwardly. When the lock has been raised to the anti-creep position (Fig. 19) the forces are still effective and are very likely to shear off the lug 247. The forces are due largely to a rocking action which is given to the coupler knuckle. My improved tight-lock coupler however, substantially eliminates these forces by reason of the fact that two tight-lock couplers coupled together are prevented from moving in any direction relative to each other. The use of the anti-creep ledge and lug is therefore not essential but simply in the nature of an additional precaution. This wedge lock may be easily raised to free the knuckle tail by applying a lifting force to the lock from above and at a slight angle to the vertical axis of the lock, as through the hole 245, so that the lug 247 is freed from the recess 249 allowing the lock to be lifted clear as shown in Fig. 20.

I believe that I am the first to provide a satisfactory coupler for tight engagement with a similar coupler which effects a tight interlock of the couplers by means of the engagement of the knuckles with each other and of the coupler and opposing knuckle and which can be successfully coupled and used with the standard E coupler having a 10A contour.

To avoid any possible confusion in replacing coupler parts, I preferably construct the knuckles of my tight-lock and semi-tight couplers so that they cannot be inserted in a standard coupler head. This may be accomplished by making the knuckles of such dimensions that they cannot be inserted in the standard coupler head.

The terms and expressions which I have employed are used as terms of description and not of limitation, and I have no intention, in the use of such terms and expressions, of excluding any equivalents of the features shown and described or portions thereof, but recognize that various modifications are possible within the scope of the invention claimed.

I claim:

1. A car coupler having a knuckle shaped to co-operate with the knuckle and coupler face of another coupler of a similar shape in tight fitting engagement, with the inner surfaces of the knuckle noses interlocked with each other, outer surfaces of the knuckle noses spaced from the opposing coupler head to provide a substantial clearance, and a substantial area of the knuckle buffing faces tightly engaging the opposing coupler faces.

2. A car coupler having a buffing face and knuckle shaped to cooperate in tight engagement with the buffing face and knuckle of a similar coupler to substantially eliminate slack therebetween, said knuckle having a pulling face shaped to engage the pulling face of the knuckle of said similar coupler in such a manner as to transmit buffing stresses in a direction parallel to the longitudinal axis of the coupler, and also diagonally of the coupler on a line passing through the buffing face of the knuckle, the knuckle nose, and the coupler face thereof.

3. A car coupler for coupling with a similar coupler or a coupler having a 10A contour, said coupler being formed with the average distance of the inner face of the knuckle less than $3\frac{11}{16}$ inches from the coupler face, when the knuckle is in closed position and when the gauge of coupler is normal, the center of said inner face being substantially equidistant from said coupler face and the buffing faces of said knuckle.

4. A car coupler for coupling with a similar coupler or a coupler having a 10A contour, said first mentioned coupler being formed with the average distance of the inner face of the knuckle not substantially more than $3\frac{3}{8}$ inches from the coupler face, when the knuckle is in closed position and when the gauge of the coupler is normal, the center of said inner face being substantially equidistant from said coupler face and the buffing face of said knuckle.

5. A car coupler having a plane buffing face substantially at right angles to the longitudinal axis of the coupler, and a knuckle provided with a plane buffing surface, and a relatively flat surface of substantial area on the outer face of the knuckle adjoining said plane buffing surface and inclined at an angle thereto, said knuckle being shaped for coupling with the head and knuckle of a similar coupler with the buffing and pulling faces thereof in substantially tight engagement.

6. A car coupler knuckle having a buffing surface, the central portion of which is substantially vertical, and upper and lower portions of said buffing face being inclined rearwardly of said central portion, and the inner face of said knuckle comprising a central face substantially at right angles to the longitudinal axis of the coupler, and upper and lower faces inclined to said central face.

7. A car coupler having a buffing face, the central portion of which is plane and at substantially right angles to the longitudinal axis of the coupler, and upper and lower substantially plane portions inclined to said central portion.

8. A tight-lock car coupler having a knuckle shaped to cooperate with the knuckle and coupler face of another coupler of a similar shape to substantially eliminate slack therebetween, with the knuckle noses interlocked with each other and the face of the knuckles engaging the opposing coupler faces under conditions of both draft and buff, and gathering means extending from each side of said coupler.

9. A tight-lock car coupler having a knuckle shaped to cooperate with the knuckle and coupler face of another coupler of a similar shape in tight fitting engagement, with the inner surfaces of the knuckle noses interlocked with each other, outer surfaces of the knuckle noses spaced from the opposing coupler head to provide a substantial clearance, and a substantial area of the knuckle buffing faces tightly engaging the opposing coupler faces, and gathering means extending from the sides of said coupler.

10. A tight-lock coupler having a coupler head and knuckle, the contour of which affords tight engagement between the pulling and buffing faces of said head and knuckle and similar faces of a mating coupler in such a manner as to prevent relative longitudinal and lateral displacement therebetween, the first mentioned coupler having laterally extending gathering wings and means on said wings adapted to cooperate with means on the wings of said mating coupler in coupled position to limit relative vertical movement therebetween, said wings being substantially free from buffing stresses in coupled position.

11. A car coupler arranged to transmit buffing stresses chiefly through the knuckle when coupled with a similar coupler and having laterally extending wings having surfaces so constructed and arranged as to bring said coupler into alignment with a mating coupler, and additional means on said wings for limiting vertical movement between said couplers, said wings being constructed and arranged so as to be substantially free from buffing stresses when said coupler is coupled with a similar coupler.

12. A tight-lock coupler, the contour of the knuckle and coupler face of which affords tight locking with the knuckle and coupler face of a mating coupler to prevent relative longitudinal and lateral displacement therebetween, the first mentioned coupler having laterally extending wings, having surfaces so constructed and arranged as to bring said coupler into alignment with a mating coupler, and additional means on said wings comprising substantially horizontal surfaces for limiting vertical movement between said couplers.

13. A car coupler having laterally extending wings having surfaces so constructed and arranged as to bring said coupler into alignment with a mating coupler, and having substantially horizontal upper and lower ledges adapted to cooperate with the wings of said mating coupler to limit relative vertical movement therebetween, said wings being substantially free from buffing stresses in coupled position.

14. A car coupler adapted to interlock in tight engagement with a mating coupler of similar shape, and provided with gathering means extending laterally from the coupler head, said gathering means comprising a wedge member on one side and a complemental socket member on the other side of the coupler head, said members being so arranged that they are substantially free from buffing stresses in coupled position.

15. A car coupler adapted to interlock in tight engagement with a mating coupler of similar shape, and provided with gathering means extending laterally from the coupler head, said gathering means comprising a wedge member on one side and a complemental socket member on the other side of the coupler head, said members being so constructed and arranged that they limit relative vertical displacement of two couplers and are substantially free from buffing stresses in coupled position.

16. A car coupler provided with means for aligning two couplers during coupling operations said means comprising a wedge projection on one side of the coupler head, having major portions of its upper and lower surfaces inclined at an angle to the horizontal and tapered toward the nose thereof with smaller portions of said upper and lower surfaces substantially horizontal, and a complemental wedge socket on the other side of the coupler head.

17. A car coupler provided with lateral wings for cooperation with similar wings on another coupler to align said couplers during coupling operations, said wings comprising a wedge projection on one side of the coupler head having its inner face inclined at an acute angle to the longitudinal axis of the coupler, and a complemental wedge socket on the other side of said coupler, a portion of the inner face of said projection being slightly concave to enlarge the throat of the coupler.

18. A car coupler provided with lateral wings for cooperation with similar wings on another coupler to align said couplers during coupling operations said wings comprising a wedge projection on one side of the coupler head, having its upper and lower surfaces inclined at an angle to the horizontal and tapered toward the nose thereof, and having its inner vertical surface tapered towards said nose, and a complemental wedge socket on the other side of the coupler head, said inner vertical surface being cut out for a portion of its length to enlarge the throat of the coupler.

19. A car coupler provided with lateral wings for cooperation with similar wings on another coupler to align the couplers during coupling operations said wings comprising a wedge projection on one side of the coupler head, having its inner vertical surface tapered towards said nose, a complemental wedge socket on the other side of the coupler head, and an inclined outer surface on the coupler head for guiding the wedge projection into said wedge socket.

20. A coupler in accordance with claim 19 in which the outer surface of the coupler head is provided with a shoulder for cooperating with the nose of the wedge projection during a coupling operation to assist in rolling an opposing knuckle into coupling position.

21. A car coupler provided with lateral wings for cooperation with similar wings on another coupler to align the couplers during coupling operations, said wings comprising a wedge projection on one side of the coupler head and a complemental wedge socket on the other side of said coupler, said wings having forwardly extending inclined surfaces to align two of said couplers vertically during coupling, and means on said wings for cooperating with means on the wings of another coupler to limit relative vertical movement of two couplers in coupled position.

22. A car coupler provided with lateral wings for cooperation with similar wings on another coupler to align the couplers during coupling operations, said wings comprising a wedge projection on one side of the coupler head and a complemental wedge socket on the other side of said coupler, said wings having forwardly extending inclined surfaces to align two of said couplers vertically during coupling, outwardly extending substantially horizontal upper and lower surfaces on said wedge projection and complemental inwardly extending surfaces on said wedge socket for limiting relative vertical movement of two couplers in coupled position.

23. A car coupler provided with lateral wings for cooperation with similar wings on another coupler to align the couplers during coupling operations, said wings comprising a wedge projection on one side of the coupler head and a complemental wedge socket on the other side of said coupler, said wings having forwardly extending inclined surfaces to align two of said couplers vertically during coupling, and means on said wings for cooperating with means on the wings of another coupler to limit relative lateral movement of two couplers in coupled position.

24. A car coupler provided with lateral wings for cooperation with similar wings on another coupler to align the couplers during coupling operations, said wings comprising a wedge projection on one side of the coupler head and a complemental wedge socket on the other side of said coupler, said wings having forwardly extending inclined surfaces to align two of said couplers vertically during coupling, and means on said wings for cooperating with means on the wings of another coupler to limit relative vertical and lateral movement of two couplers in coupled position.

25. A car coupler having a knuckle shaped to engage the buffing and pulling faces of a similarly shaped coupler and knuckle in substantially tight engagement therewith, lateral wings on said coupler for aligning two of the couplers during a coupling operation, and substantially horizontal and vertical surfaces on said wings for limiting relative vertical and lateral movement of said two couplers when in coupled position.

26. A car coupler comprising a head and a knuckle shaped to cooperate with a similar coupler with the buffing and pulling faces thereof in tight engagement with each other, means extending laterally from each side of said coupler for limiting relative vertical movement of two of said couplers in coupled position, and a wedge lock for maintaining said knuckle locked in substantially tight engagement with the head and knuckle of the opposing coupler under conditions of either draft or buff.

27. A car coupler comprising a head and knuckle shaped to cooperate with the head and knuckle of a similar coupler with the buffing and pulling faces thereof in tight engagement with each other under conditions of either buff or draft so that buffing stresses are transmitted chiefly through the knuckle, means for limiting relative vertical movement of two of said couplers in coupled position, and a gravity operated wedge lock for maintaining said coupler locked in tight engagement with the opposing coupler.

28. A car coupler comprising a head and knuckle shaped to cooperate with the head and knuckle of a similar coupler with the buffing and pulling faces thereof in tight engagement with each other under conditions of either buff or draft so that buffing stresses are transmitted chiefly through the knuckle, means for limiting relative vertical movement of two of said couplers in coupled position, a gravity operated wedge lock for maintaining said coupler locked tight in coupled position and means for preventing said lock from creeping upwardly.

29. A car coupler comprising a coupler head having a buffing face, a knuckle shaped to cooperate with the head and knuckle of a similar coupler in substantially tight engagement therewith and to substantially eliminate slack therebetween, said coupler and knuckle being arranged to transmit buffing stresses principally through said knuckle, and a wedge lock for wedging the tail of said knuckle tightly against said coupler head in coupled position.

30. A car coupler comprising a coupler head having a buffing face thereon, and a knuckle shaped for coupling with the knuckle and head of a similar coupler so that the buffing and pulling faces of said coupler head and knuckle are in substantially tight engagement with each other at the same time, the tail of said knuckle being shaped so that it may be wedged tightly against the coupler when coupled with a similar coupler.

31. A car coupler comprising a coupler head having a buffing face thereon, a knuckle pivotally mounted on said head for rotation about a single center, said knuckle being shaped for coupling with the knuckle and head of a similar coupler in substantially tight engagement and for transmitting substantially all of the buffing stresses through said knuckle and coupler head.

32. A car coupler comprising a coupler head having a buffing face thereon, and a knuckle shaped for coupling with the knuckle and head of a similar coupler in substantially tight engagement with both the pulling and buffing faces thereof, means for holding said knuckle against movement, said knuckle having a pulling face, the center of which is spaced midway between said buffing face and the buffing face of said knuckle in coupled position.

33. A car coupler comprising a coupler head having a buffing face thereon, and a knuckle shaped for coupling with the knuckle and head of a similar coupler in substantially tight engagement with the knuckle noses interlocked to prevent relative lateral movement between the couplers and to eliminate substantially all slack therebetween, said coupler being shaped to transmit buffing stresses principally through said knuckle.

34. A car coupler having a knuckle including a nose portion and a buffing face, and a buffing face on the head substantially parallel to the knuckle buffing face, said knuckle having a pulling face the center of which is located substantially half-way between said buffing faces, and said knuckle having a face sloping rearwardly from said knuckle buffing face and forming the counter of the nose portion of said knuckle in such a manner that the extent of said knuckle buffing face is limited to an area out of longitudinal alignment with said knuckle pulling face.

35. A car coupler comprising a head and a knuckle, wedge means for locking said knuckle rigidly with respect to said head, said head and knuckle having transversely disposed, substantially parallel buffing faces spaced apart a distance substantially equal to the spacing of the corresponding buffing faces of the A. A. R. standard 10—A contour so that said coupler when coupled with a coupler having a 10—A contour will distribute buffing loads thereto, said knuckle having a pulling face the central point of which is located substantially midway between said buffing faces, so that when said coupler is coupled to a similar coupler, a substantially tight coupling will be effected.

36. A car coupler comprising a coupler head having a buffing face thereon, a knuckle shaped for coupling with the head and knuckle of a similar coupler in substantially tight engagement with the knuckle noses interlocked and the knuckle buffing faces in engagement with the buffing faces of said coupler head to prevent relative lateral movement between the couplers under conditions of either buff or draft, and gathering wings on each side of said coupler head for aligning said coupler vertically and laterally with a mating coupler during a coupling operation.

37. A tight-lock car coupler as defined in claim 2 including gathering means extending from each side of the coupler head for cooperating with similar means on a similar coupler to align said couplers during a coupling operation, said gathering means being relatively free from buffing stresses.

ARTHUR J. BAZELEY.

CERTIFICATE OF CORRECTION.

Patent No. 2,178,062. October 31, 1939.

ARTHUR J. BAZELEY.

It is hereby certified that error appears in the printed specification of the above numbered patent requiring correction as follows: Page 4, first column, line 61, for the numeral "20" read --220--; page 7, second column, line 48, claim 34, for "counter" read --contour--; and that the said Letters Patent should be read with this correction therein that the same may conform to the record of the case in the Patent Office.

Signed and sealed this 8th day of October, A. D. 1940.

(Seal)

Henry Van Arsdale,
Acting Commissioner of Patents.

der conditions of either buff or draft, and gathering wings on each side of said coupler head for aligning said coupler vertically and laterally with a mating coupler during a coupling operation.

37. A tight-lock car coupler as defined in claim 2 including gathering means extending from each side of the coupler head for cooperating with similar means on a similar coupler to align said couplers during a coupling operation, said gathering means being relatively free from buffing stresses.

ARTHUR J. BAZELEY.

CERTIFICATE OF CORRECTION.

Patent No. 2,178,062.     October 31, 1939.

ARTHUR J. BAZELEY.

It is hereby certified that error appears in the printed specification of the above numbered patent requiring correction as follows: Page 4, first column, line 61, for the numeral "20" read --220--; page 7, second column, line 48, claim 34, for "counter" read --contour--; and that the said Letters Patent should be read with this correction therein that the same may conform to the record of the case in the Patent Office.

Signed and sealed this 8th day of October, A. D. 1940.

(Seal)

Henry Van Arsdale,
Acting Commissioner of Patents.